United States Patent [19]
Kim

[11] Patent Number: 5,986,223
[45] Date of Patent: *Nov. 16, 1999

[54] TOUCH PANEL WITH A CONTACT CONDUCTIVE LAYER COMPRISING A PHOTOTRANSPARENT ORGANIC CONDUCTIVE FILM

[75] Inventor: Hyeongdong Kim, Suwon-si, Rep. of Korea

[73] Assignee: Samsung Display Devices Co., Ltd., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,420

[22] Filed: Mar. 28, 1996

[30] Foreign Application Priority Data

Dec. 19, 1995 [KR] Rep. of Korea ............... 95-52016

[51] Int. Cl.$^6$ ................................................. G08C 21/00
[52] U.S. Cl. ........................... 178/18.01; 178/18.03; 178/18.05

[58] Field of Search .................. 178/18.01, 18.03, 178/18.05, 18.07; 345/173, 174

[56] References Cited

U.S. PATENT DOCUMENTS

| | | | |
|---|---|---|---|
| 5,072,076 | 12/1991 | Camp, Jr. ............................ | 178/20 |
| 5,220,136 | 6/1993 | Kent .................................... | 178/18 |
| 5,543,587 | 8/1996 | Ikura et al. ......................... | 178/18 |
| 5,668,353 | 9/1997 | Matsuda et al. ................... | 345/173 |
| 5,668,376 | 9/1997 | Ikura et al. ......................... | 345/173 |

*Primary Examiner*—Vijay Shankar
*Attorney, Agent, or Firm*—Christie, Parker & Hale, LLP

[57] ABSTRACT

This invention relates to a touch panel with improved resistance property to resolve problems of conductive layer crack by manufacturing a touch panel comprising a combined conductive film by a film coated with a conductive layer in the touch panel structure which is substituted with a phototransparent organic conductive film. It also has an economical advantage that it can be used perpetually if the conductive film in the lower part is not impaired.

8 Claims, 1 Drawing Sheet

TOUCH PANEL WITH A CONTACT CONDUCTIVE LAYER COMPRISING A PHOTOTRANSPARENT ORGANIC CONDUCTIVE FILM

BACKGROUND OF THE INVENTION

1. Field of the Invention

This invention relates to a touch panel, more particularly, to a touch panel in which the contact conductive layer is substituted with phototransparent organic conductive films to give conductivity per se, thus not requiring the coating process of the conductive layer and resolving problems of crack bacause of the conductive layer.

2. Description of the Related Art

A touch input system, including a touch panel which determines the position of an object which is in contact with a contact surface, has been used variously in the fields of computer graphics, and design and manufacturing systems using computers. The touch system denotes a system consisting of a digitizer which responds to a touch on a specific position of a contact surface, and can be driven by touching with the finger of an operator because of a transparent covering layer on a conductive surface.

The driving principle of a touch panel in the touch panel system is as follows:

A contact surface of a touch panel has equal specific electrical resistance and is connected to an electrode made of a material of which conductivity is greater than that of the contact surface. This touch input system consists of a means which applies an electrical potential across a contact surface in the direction 2 or the direction vertical to the direction 1 after an electrical potential across a contact surface in the direction 1 is applied. Consequently, if the contact is touched by the finger of an operator or an object such as a touch pen, an electrical potential of the touched position is measured which corresponds to a distance between positions of objects on contact surface as well as the distance between an electrode and an object. The system consists of means not only providing x-y coordinates but also determining and providing z axis value on the basis of parameters of pressure or position. Dot space plays the role of wrapper for double film and dot space tip in the dot spaces damages conductive layer (2') easily by being applied on the conductive layer (2') heavily to induce crack of the conductive layer, which is caused by the formation of the wrapper and the sharpness of a tip. Therefore, by blunting the formation of the wrapper and the sharpness of the tip using adhesive as a cushion, some problems of crack are solved, but there still remain problems that the blunt space tip is difficult to make and there are no essential countermeasures for crack on the conductive layer. To solve the problems, the structure of the touch panel double film in FIGS. 1 and 2 is used. The structure consists of the conductive layers formed on the upper part of the base substrate and on the lower part of the double film which are separated by insulated dot space (3), and the lower film coated with the upper film (5') on both sides thereof, and the hardcoating layer thereon.

The touch panel with this structure is operated according to a principle that coordinate values are recognized using positional change of resistance values when substrate conductive layer (2) of the base substrate and contact conductive layer (2') of the film are attached by touching with a touch pen. In general, glass, plastics or various printer circuit substrate materials, or a rigid body such as a metal with an insulated layer are used as the base substrate (1), and a hard plate coated with plastic material in the form of a soft layer thereon, as well.

Conductive layers (2, 2') consist of a transparent conductive material for which typically indium tin oxide (ITO) is used. Polyester group resins such as polyethylene terephtalate (PET) and polycarbonate are used as the films (5, 5').

FIG. 1 indicates the structure with conductive layers coated on both sides of the lower film (5) and FIG. 2 indicates the structure in which only the substrate conductive layer (2) of the upper part of the base substrate and the conductive layer attached thereto are used by coating only one side of the lower film (5).

Generally, the film of a thickness of about 25 $\mu$m is used as the lower film, and the thickness of the conductive layer can be adjusted to about 100 Å as a conductive layer having the resistance of 300 $\Omega/\square$ is used.

The crack is solved to some degree using the double film structure in FIGS. 1 and 2. However, problems still remain because the crack of the conductive layer is eventually generated which causes an error in operation by changing the value of resistance, and particular countermeasures therefor have not been developed so far.

SUMMARY OF THE INVENTION

The object of the present invention is to resolve problems induced with coating conductive layers by providing a touch panel in which the film coated with a conductive layer is substituted with the phototransparent organic conductive film.

To achieve the object of the present invention, provided is a touch panel comprising a substrate (1) made of a transparent insulated material, a substrate conductive layer (2) formed on the substrate, a dot space (3) formed between the substrate conductive layer and a contact conductive layer (2'), the contact conductive layer (2') causing change of electrical resistance by external contact on the dot space, wherein the touch panel is characterized in that the contact conductive layer is consists of a phototransparent organic conductive film (7).

According to the invention, the contact conductive layer consisting of a phototransparent conductive film can further comprise a customary hardcoating layer on the surface thereof to improve abrasion and friction properties of the phototransparent conductive film (7), as indicated in FIG. 3.

In addition, the contact conductive layer according to the invention can further comprise a phototransparent conductive coating layer (2') on one or both sides of the phototransparent conductive film (7), as indicated in FIG. 4.

Moreover, the contact conductive layer according to the invention in FIG. 4 further comprises a protective film layer (5) such as polyester film thereon.

According to the invention, the phototransparent organic conductive film can be simply manufactured by the method that white powder of metal oxides consisting of indium oxide, antimony oxide, tin oxide, etc., are added to an ordinary polymer for the formation of films to have 300–800 $\Omega/\square$ of resistance value of the mixed polymer.

The following is presented as an example but does not limit the scope of the invention.

DETAILED DESCRIPTION

EXAMPLE 1

Figure 3:
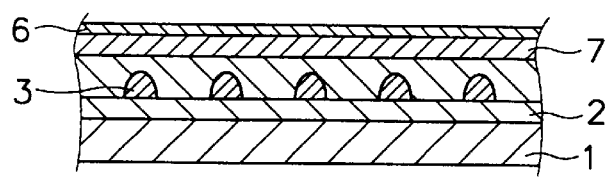
FIG. 3 is a cross-sectional view of the touch panel according to Example 1 of the present invention.

ITO was coated on a transparent insulated substrate by a chemical vapour deposition method indicated in FIG. 3 to form a transparent conductive layer, dot spacer of insulated material was formed thereon, and a thin phototransparent organic conductive film was hardcoated thereon to manufacture a touch panel.

EXAMPLE 2

Figure 4:
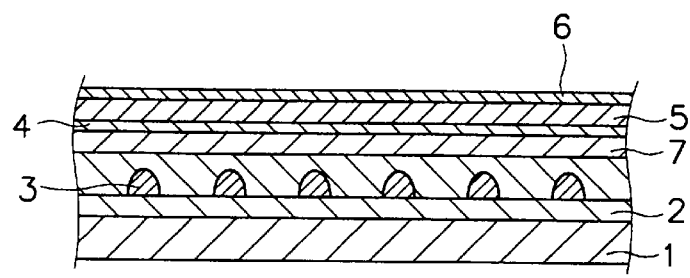
FIG. 4 is a cross-sectional view of the touch panel according to Example 2 of the present invention.

A touch panel was manufactured the same as the process of Example 1 except that one more layer of film is attached onto the thin phototransparent organic conductive film by an adhesive as indicated in FIG. 4.

EXAMPLE 3

A touch panel was manufactured the same as the process of Example 2 except that ITO was coated on both sides of the thin phototransparent organic conductive film.

To evaluate the quality of the touch panels manufactured in the above described Examples 1 to 3, the resistance property of transparent conductive layer of the touch panels is measured. The result was indicated in the following table:

TABLE

|  | Resistance Property Improvement Percentage |
|---|---|
| Example 1 | 100 |
| Example 2 | 100 |
| Example 3 | 95 |

Figure 1:
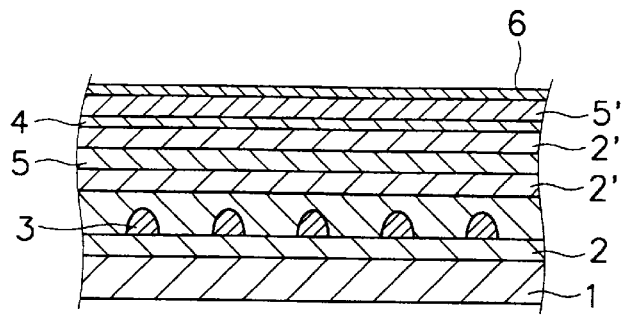
FIG. 1 and FIG. 2 are cross-sectional views of the conventional double film touch panels.
Figure 2:
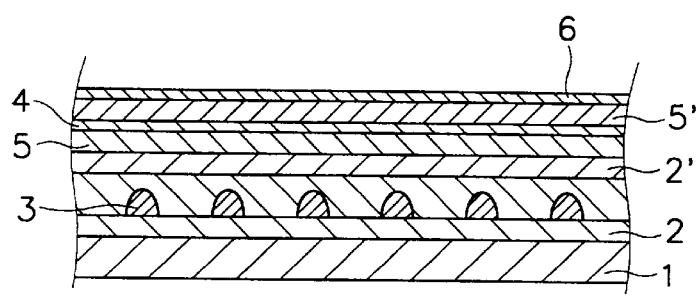

As shown in the above-described table, the resistance property of the touch panel according to the present invention was improved almost completely in comparison with the touch panels with the double film structure indicated in FIGS. 1 and 2 of the conventional method, and the problems of the resistance change for crack were solved. In general, because resistance of the phototransparent organic conductive film of 300 $\Omega/\square$, which is the resistance required for a touch panel, was difficult to obtain (over 80%) taking into consideration phototransmittance, and the transparent conductive layers coated thereon. And more efficient structure of the touch panel is when phototransmittance and the resistance value of the phototransparent organic conductive film is about 300–800 $\Omega/\square$. Moreover, the touch panel has an economic advantage because it is capable of being used permanently if a phototransparent organic conductive film is not damaged.

What is claimed is:

1. A touch panel, comprising:
   a substrate comprising a transparent insulated material;
   a substrate conductive layer formed on said substrate;
   a contact conductive layer comprising a phototransparent organic conductive film; and
   a dot space formed between said substrate conductive layer and said contact conductive layer.

2. The touch panel of claim 1 wherein said contact conductive layer further comprises a phototransparent conductive coating layer on one or both sides of the phototransparent organic conductive film.

3. The touch panel of claim 1 wherein said contact conductive layer further comprises a protective film layer on said phototransparent organic conductive film.

4. The touch panel of any one of claim 1 to claim 3 wherein said contact conductive layer further comprises a hardcoating layer on the surface thereof.

5. The touch panel of claim 1 wherein said phototransparent organic conductive film comprises a white powder metal oxide dispersed in polymer with a resistance substantially between 300–800 $\Omega/\square$.

6. The touch panel of claim 5 wherein said metal oxide is selected from the group consisting of indium oxide, antimony oxide, and tin oxide.

7. The touch panel of claim 2 wherein said phototransparent conductive coating layer comprises an indium tin oxide layer.

8. A touch panel comprising:
   a substrate having a transparent insulated material;
   a substrate conductive layer formed on the substrate;
   a contact conductive layer comprising a phototransparent organic conductive film having metal oxide powder dispersed in polymer, said contact conductive layer being disposed above the substrate conductive layer to form a gap therebetween; and
   a plurality of dot spaces formed in the gap.

* * * * *